UNITED STATES PATENT OFFICE.

JOHN WILLIAM HALLMAN, OF TORONTO, CANADA, ASSIGNOR TO BERNARD LINDMAN, OF WILLIAMSPORT, PENNSYLVANIA.

COMPOSITION FOR MELTING SNOW.

SPECIFICATION forming part of Letters Patent No. 533,950, dated February 12, 1895.

Application filed March 6, 1893. Serial No. 464,812. (No specimens.)

*To all whom it may concern:*

Be it known that I, JOHN WILLIAM HALLMAN, civil and marine engineer, of the city of Toronto, in the county of York and Province of Ontario, Canada, have invented a certain new and useful composition of ingredients for melting ice and snow from street-railways, sidewalks, pavements, manholes in sewers, and all places where it is desirable to remove the same, of which the following is a specification.

This invention relates to a new process and composition of matter to be used for the melting of snow or ice especially from the rails of street railways. It is composed of water, common salt or sodium chloride, acetic acid, and hydro chloric acid. As an example of the proportion in which these ingredients may be used, the following may be given: water, one hundred gallons; salt, thirty gallons; acetic acid, ten gallons; hydro chloric acid, thirteen gallons.

In the preparation of the above compound, the salt is first dissolved in warm water and the acetic acid is then added to the solution. When it is desired to use the melting mixture, the hydro chloric acid is added; the result of the addition of which being a rise in temperature.

It has long been known that a solution of water and common salt has the power of melting ice and snow at a temperature much below the freezing point, and it retains this solvent power until its temperature has been reduced to that of the ice and snow which it is desired to melt.

My composition is an improvement upon this, because the addition of the acids lowers the congealing point of the mixture.

The proportion above given is that which will be found to be of the most general utility and it is used when the ice or the snow to be dissolved has a temperature not lower than 10° or 15° Fahrenheit. When it is desired to dissolve ice or snow below those temperatures, I vary the proportions by increasing the percentage of salt, acetic acid and hydro chloric acid.

The following is an example of such a composition:—water, one hundred gallons; salt, forty gallons; acetic acid, fifteen gallons; hydro chloric acid, twenty-six gallons.

It is to be observed that of the four cheapest and most common acids, to wit: sulphuric, hydro chloric, nitric, and acetic, only the acetic and hydro chloric are available. Sulphuric acid cannot be used because it decomposes the salt forming an acid or normal sulphate. Nitric acid could not be used because it decomposes both the salt and the hydro chloric acid. Sulphuric or nitric acid could therefore not be used to advantage in my composition, either as additional ingredients or as substitutes for the acetic or the hydro chloric acid.

As before stated, the hydro chloric acid is not added to my composition until it is ready for use. When the composition is in its finished state and while still warm, it is applied to the ice or snow which it is desired to melt, in quantities sufficient for the purpose. The rise of temperature in the mixture caused by the addition of hydro chloric acid and which is due to some of the water in a free state combining as water of hydration, is a feature of advantage, because thereby the quantity of solution needed to melt a certain amount of ice or snow is much reduced.

What I claim is—

A composition consisting of water, sodium chloride, acetic acid, and hydro chloric acid, in the proportions, substantially as described.

JOHN WILLIAM HALLMAN.

Witnesses:
 H. DIXON,
 C. L. LOWRIE.